July 2, 1968  G. MATLOW  3,390,703
MULTILAYER INSULATING MEANS
Filed Sept. 30, 1966
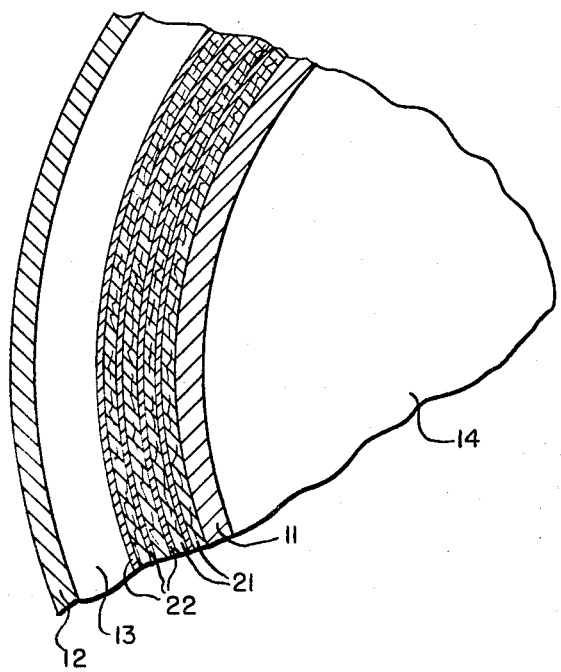
INVENTOR
GEORGE MATLOW
BY
MC NENNY, FARRINGTON, PEARNE & GORDON
ATTORNEYS 3,390,703
MULTILAYER INSULATING MEANS
George Matlow, Cleveland, Ohio, assignor to Ryan Industries, Inc., Cleveland, Ohio, a corporation of Ohio
Filed Sept. 30, 1966, Ser. No. 583,220
10 Claims. (Cl. 138—114)

This invention relates to insulation for cryogenic vessels and the like and particularly to filled-vacuum insulations of the multilayer type wherein radiation shields are separated by layers of fibrous material which holds the shields in spaced relation and also apparently acts as a filler that interferes with the movement of the residual gas molecules remaining in the evacuated space to thereby inhibit the transmission of heat energy via such molecular movement. In serving this latter function, the fibrous material appears to be equivalent to the powder first suggested for this purpose early in this century by Smoluchowski, see German Patent 268,490.

In the early 1950's P. Petersen of Lund, Sweden suggested such filled-vacuum insulations of the multilayer type employing fine glass wool or glass down, see for example P. Petersen, Förvaringskärl för flytande syre (Container for Liquid Oxygen), Meddelanden från Flyg- och Navalmedincinska Nämnden (Communications from the Aero Medical and Naval Medical Committee), No. 2, 1952, pp. 8–10, published in Stockholm.

In the United States in the latter 1950's several patents issued also relating to multilayer insulation employing glass wool and glass paper, see U.S. Patents 3,007,596; 3,009,600; 3,199,715.

Earlier than the foregoing, the use of glass cloth as a fibrous spacer was mentioned by Latham in U.S. Patent 2,448,491, but such disclosure has been taken as lacking in the features that result in the insulating performance of the later insulation systems.

The fibrous components of such later insulations are however relatively fragile, and care must be taken in the assembling and wrapping of these fragile components, together with radiation shields of foil, around the inner shell of a vessel to be insulated, so that damage to the insulation and consequent substantial reduction of its insulating effectiveness may be avoided. This problem is recognized and special apparatus and procedures are directed to its solution in U.S. Patents 3,019,573 and 3,145,515. The problem is also discussed in U.S. Patent 3,199,715 which mentions as one partial solution at column 2, line 10, the use of bulking techniques to relieve the sheet of compression and increase the achievable frequency of radiation shields or barriers. That patent also discloses as its specific subject an improvement in conductivity and strengthening of the sheet by the use of finely divided heat reflective particles or bodies dispersed throughout the layers of fibrous material.

The emphasis in much of such prior-art discussions is on the frequency of radiation barriers and on thermal conductivity values. There is little or no emphasis on overall count of barriers as distinguished from frequency of barriers. There is little or no emphasis on overall heat flux as distinguished from conductivity. In general the favorable conductivity values presented result only when the number of wrappings is fairly low, and diminishing returns are encountered rather promptly as the number of wraps is increased, and this is only somewhat moderated by resort to bulking techniques.

Certain of the more recently proposed other glass fiber materials, such as the cloths disclosed in U.S. Patent 3,198,687, also are fragile and have the foregoing characteristic of rather quickly diminishing returns, possibly due to their other low apparent density and wide thin mesh which defines wide empty central zones, or to their use of glass fiber felt in conjunction with the glass cloth.

I have discovered that a cloth of fibers of glass or the like may be provided that is rugged and insensitive to high degrees of wrap, and that such cloth may be employed to provide a practical filled-vacuum multilayer insulation by exploiting such insensitivity of the cloth to high degrees of wrap. The cloth contemplated by the invention has a relatively high tensile strength as compared to glass papers and the like, and insulation employing this material is easily handled and can be applied to tanks without the tearing difficulties encountered with other materials. Surprisingly this material appears to be so insensitive to the mechanical pressure resulting from given quantas or values of wrapping tension and insulation weight that it may be wrapped on itself 25 or 30 or more times with little or no diminishing return, i.e. with little or no increase in conductivity value. Heat flux continues to diminish substantally in strict inverse proportion to the number of turns or wraps. It may be conjectured that this apparent lessened sensitivity may at least in part be a result of the relatively great tensile strength and density (weight) of the bound-fiber cloth I employ and to the unoriented configuration of the fibers therein, as more fully discussed below. In any event, I can continue to decrease total heat flux by increasing wrapping with little increase and even with a slight decrease in calculated K value as the number of wraps becomes relatively high, whereas insulations employing for example glass paper show a substantial increase in calculated K value as the number of wraps becomes comparably high. As a result, I have found that multilayer insulations employing binder can be advantageously employed when wrapped to 25 or preferably 30 or more turns to achieve a sufficiently low heat flux and therefore a sufficiently high performance that they meet commercial requirements for liquefied gas containers of relatively small sizes, such as 30 gallons, despite the unfavorably high surface to volume ratio of such relatively small containers.

In production wrapping operations with the present invention, the fibrous material and interleaved radiation barriers can be fed together or separately, and even the fibrous material can itself be fed under some tension, thus providing a simple and reliable manufacturing operation for accomplishing a firm wrapping without special procedures and apparatus such as those referred to in U.S. Patents 3,019,573 and 3,145,515, and without special preliminary paper-making procedures such as involved in the dispersion of heat reflective particles as in U.S. Patent 3,199,715, and without resort to special bulking techniques.

Although minimal fiber diameters have been considered important to good insulation performance in the prior art, I have accomplished very good insulation performance at relatively high fiber diameters as the figures to be given below will show. Although it has previously been proposed that such larger fiber diameters could be employed, if unbounded, or if used with dispersions of finely divided reflective particles, the fibers to be oriented in either case, it has never been conceived that fiber diameters of 7.2 microns, can, in the absence of dispersions of finely divided reflective materials, achieve better results that the best 2.5 to 3.8 micron unbonded insulations known—better than those mentioned for example in the foregoing U.S. Patents 3,007,569 and 3,099,- 600. I can use fibers of smaller or even larger diameters, than 7.2 microns, but the results that I achieve with even so large a diameter as 7.2 microns are startling, particularly considering that the fibers are bonded and unoriented. However insulations are contemplated having fiber diameters of from a fraction of a micron or one or several microns at one extreme to diameters well in excess of 10 microns at the other extreme.

Shown in the drawing is a schematic fragmentary cross-section of an embodiment of the invention. The inner and outer walls 11 and 12 of a double-walled vessel define a vacuum space 13 preferably evacuated to less than 0.1 micron of mercury. Cryogenic fluid or the like to be stored is contained within the interior 14 of the inner vessel 11.

The inner vessel 11 is surrounded by a composite wrapping of alternating layer of one or more plies of glass fiber cloth 21 and radiation barrier layers 22 supported by the cloth layers.

The radiation barriers are aluminum foil or other metal foil such as gold, silver, or copper, or the barriers may comprise coatings or deposits of such metals on plastic sheets or other substrates. This material may have a thickness of several microns, or any of the other thicknesses mentioned in the foregoing multilayer insulation patents. A particular metal thickness employed is .0002 inch, or about 5 microns.

In the particular embodiment illustrated the cloth 21 consists of threads made of glass fibers approximately 7.2 microns in diameter and consisting of continuous fibers. The fiber diameter can be larger or smaller and the fiber can be of short or long lengths depending on the method of manufacture of the fibers and the cloth. The illustrated fabric has a twist in the warp and woof threads of one to two turns per inch, and in this sense the fibers are unoriented in that, if the fibers are long, they are neither parallel to nor normal to any particular plane or surface, or if the fibers are short, they individually are oriented in many directions and collectively they are unoriented. That is not to say that the fibers lack any regularity of configuration, since they may in a more or less regular manner extend as helices or in helical array along the lengths of the threads that they constitute. However, the twist of the thread rules out the orientation present in fibrous spacers such as glass paper or glass mat. This is the meaning of unoriented as used in the claims herein.

The illustrated cloth is woven with 19 by 20 threads per inch. Its thickness is approximately .004 inch. It weighs approximately 1.6 ounces per square yard. The binder employed is a light starch binder designated a Syton weaveset finish in the glass fabric industry. It is also referred to as a dulling agent and may be applied by a dipping operation by the glass cloth manufacturer. A commercially available glass cloth conforming to the above description is commercially designed HG20 and is manufactured by Hess-Goldsmith Company.

The prior art has been somewhat equivocal concerning the use of binder. U.S. Patent 3,009,600 emphasizes the importance of avoiding binder at column 6, line 6. British Patent 715,174 at page 8, line 46 makes the same point. And U.S. Patent 3,007,596 mentions unbonded fibrous materials as suitable at column 5, but nowhere does it mention bonded fibrous materials as suitable, and at page 6 of paper number 24 in the file wrapper of such patent the patentee equates "unbonded" to "low conductive." However, U.S. Patent 3,199,715 employs binders which are described at length at column 7 thereof, but such binders are used together with a dispersion of finely divided heat reflective particles. It may be that, heretofore, no commercially practical bound-fiber high-performance multilayer insulation that does not require the presence of dispersed finely divided heat reflective particles has ever been provided and such provision has not been taught in published references that I am aware of.

In general, in the practice of the present invention the binders and thin proportion to weight of the cloth are the same as commonly employed manufacture of glass fiber materials, and indeed several commercially available glass cloths may be purchased from established manufacturers or dealers and may be wrapped "as is" on the inner vessel of a container together with aluminum foil or other radiation barrier material to provide the insulation of the invention. The cloths referred to include cloths designated HG10, HG20, TS107, TS108. In general, the cloths should be set with binder, have a mesh count of from 10 to 60 meshes per inch with a square mesh count of between about 150 and 4,000 meshes per square inch, a thickness of between about .001 and .01 inch, a weight of between about 0.5 and 3 ounces per square yard, and a tensile strength of at least about 5 or 10 pounds per inch of fabric width, or preferably from 30 to 60 or more pounds per inch. In general, the binder will conventionally constitute a low percentage by weight of the cloth, say less than 20%, or more narrowly less than 10% or even 5%, although it may be above or below these latter figures. Among binders which may be employed alone or together are colloidal silica, cornstarch, polyvinylidene chloride, polyvinyl acetate, polyvinyl chloride, natural gums (e.g. carana), acrylic resins, and epoxy resins.

A composite wrapping including the particular cloth described was wrapped around the inner shell of a 30 gallon test vessel until there were 20 layers of the composite insulation. Another identical composite wrapping was wrapped around a like 30 gallon test vessel until there were 30 layers of wrapping. When filled with liquid nitrogen and measured for heat flux under equilibrium conditions, the composite wrappings of each test vessel showed substantially the same thermal conductivity value. The test vessel containing 20 wraps showed a calculated value of .0000308 B.t.u./(hr.)(sq. ft.)(° F./ft.) between 70° F. and −320° F. with the test vessel maintained at less than 0.1 micron of mercury. The test vessel containing 30 wraps showed a calculated thermal conductivity value of .0000302 expressed in the same units.

How striking these results are becomes evident when the magnitude of fiber diameter in this example is contrasted with the fiber diameters of the best of the prior art, and when the respective ratios of conductivity to fiber diameter are compared as in the following table.

| Best system(s) of the following U.S. patents | Conductivity, K×10⁵, B.t.u./(hr.) (sq. ft.) (° F./ft.) | Fiber diameter, microns | Conductivity per unit fiber diameter, K/micron × 10⁵ |
|---|---|---|---|
| (1) 3,007,596 (fine fiber) | 1.95 | [1] .35 | 5.6 |
| (2) 3,007,596 (coarse fiber) | 7.5 | [2] 3.15 | 4.2 |
| (3) 3,009,600 | 2.5 | [1] .35 | 7.1 |
| (4) 3,199,715 (without bulking strip) | 2.0 | [3] .625 | 3.2 |
| (5) (with bulking strip) | 1.45 | [3] .625 | 2.3 |
| (6) present example | 3.08 | 7.2 | 0.5 |

[1] 0.2 to 0.5 microns, commercial designation AAAA or type 101.
[2] 2.5 to 3.8 microns, commercial designation B.
[3] 0.5 to 0.75 microns, commercial designation AAA or type 106.

From the table it is seen that the thermal conductivity of the given example of the invention (item 6) is less than half that of the coarse-fiber example on which quantitative data has been previously given (item 2), and this despite the fact that the present example of the invention uses fibers that are almost twice as coarse, and that are bonded and unoriented. Furthermore, the thermal conductivity of this coarse-fibered example of the present invention is only slightly higher than even the best of the above-listed examples of the named prior art references (the best examples all being fine-fibered), and in departing from the prior art by using the described unoriented bonded-fiber cloth I have radically reduced the conductivity per unit fiber diameter to less than a quarter of that of any of these examples from the prior art. Thus I can even provide relatively coarse fibers and exploit the advantageous characteristics of the tough and tension-insensitive bonded-fiber cloths made therefrom in a way to more than make up for any slightly unfavorable comparisons between their conductivities and the conductivities of even the finest-fibered insulations of the prior art. In terms of total heat flux in a given installation, rather than mere conductivity, my insulation system can, even with coarse fiber, surpass the best of these examples of the prior art, and this attribute of the present invention is entirely aside from the additional advantages accruing from its ruggedness and ease of handling.

Thus, unlike fibrous spacers such as glass mat and glass paper, the bonded-fiber cloths of the present invention have a far higher apparent resistance to stresses incident to high numbers of wraps. In terms of total heat flux, there may be little "diminishing return" as wrapping is continued to 25 or 30 wraps or more. Indeed, in many cases in the practice of the present invention, heat flux through the insulation continues to drop substantially in strict inverse proportion to the number of wraps between 20 and 30 wraps so that there is substantially no diminishment in the rate of performance improvement per wrap between these counts of wrap. A corollary of this is the substantial uniformity of the conductivity value for the two thicknesses of wrapping, as indicated above. This is to be contrasted with multilayer insulations employing fibrous spaces such as glass paper or glass mat. Such materials do exhibit diminishing returns with a large number of wrappings, even to the extent that a type of glass paper multilayer insulation now in wide commercial use shows little or no reduction in total heat flux as between 20 and 30 wraps when employed on thirty-gallon test vessels like those referred to above, thus connoting a reduction in K value of approximately 50% between those two degrees of wrap, and foreshadowing further drastic reduction with continued winding.

Thus it will be seen that I have provided an insulating system that is comparable to the prior art in terms of conductivity, that is superior to the best of the above listed examples of the prior art in terms of conductivity per unit fiber diameter, that is adapted for realizing lower total heat flux in given installations than the best of the prior art, and that is rugged and easy to handle in manufacturing operations. In regard to this last point, tensile strengths of some of the best performers of the prior art, say items 1 and 3 of the foregoing table, may be in the order of substantially less than 1 pound per inch of fabric width. A tensile strength of 1 pound per inch or more would be relatively strong. However in the practice of the present invention, strengths of 40 or 50 pounds per inch are typical, although the invention contemplates somewhat lower strength in some instances.

Although the insulation described by way of example in the foregoing consists of aluminum foil separated by spacers of fabric comprising fibers of glass, it will be appreciated that the invention is not limited to the use of such materials. Sheets of other metals such as gold, copper, tin, or silver, or even very thin sheets of a metallised flexible material, may be employed. Likewise, the fibers of glass may be replaced by fibers of any other material which has low thermal conductivity and which can maintain its characteristics under high vacuum after exposure to the heating that is normally involved in commercial evacuation, and such equivalents are to be understood to be contemplated by the term glass fiber.

What is claimed is:

1. Thermal insulation means for low temperature service comprising a composite wrapping of alternating layers of one or more plies of woven glass fiber cloth having bonded fibers, and radiation barrier layers supported by the cloth and constituting substantially the only metallic material within the composite wrappings, said cloth having a mesh count of from 10 to 60 meshes per inch with a square mesh count of between 150 and 4000 meshes per square inch, said cloth having a thickness of between .001 and .010 inch, a weight of between 0.5 and 3 ounces per square yard, said composite wrapping exhibiting in cylindrical 30 gallon test vessels a thermal conductivity value that is substantially the same for both 20 test wraps and 30 test wraps, said composite wrapping surrounding the inner shell of a double walled cryogenic vessel and being located in the evacuated space between the inner and outer shells of the vessel.

2. Means as defined in claim 1, the fibers of the cloth being unoriented and twisted into warp and woof threads having one to two turns per inch.

3. Means as defined in claim 1, the actual number of wraps of said composite wrapping exceeding 20.

4. Means as defined in claim 1, the thermal conductivity value exhibited by said composite insulation being in the instance of both 20 and 30 test wraps less than .00004 B.t.u./(hr.)(sq. ft.)(° F./ft.) between 70° F. and $-320°$ F. at less than 0.1 micron of mercury.

5. Means as defined in claim 1, the ratio of conductivity to unit fiber diameter being less than $1.0 \times 10^{-5}$ between 70° F. and $-320°$ F. at less than 0.1 micron of mercury where K is given in B.t.u./(hr.)(sq. ft.)(° F./ft.) and fiber diameter in microns.

6. Means as defined in claim 1, the ratio of conductivity to unit fiber diameter being less than $0.5 \times 10^{-5}$ between 70° F. and $-320°$ F. at less than 0.1 micron of mercury where K is given in B.t.u./(hr.)(sq. ft.) (° F./ft.) and fiber diameter in microns.

7. Means as defined in claim 1, the fibers of the cloth being unoriented and twisted into warp and woof threads having one to two turns per inch, the cloth having a thread count of 19 by 20 threads per inch, a thickness of about .004 inch, and a weight of approximately 1.6 ounces per square yar.

8. Means as defined in claim 1, including the vessel between whose shells the composite wrapping is positioned.

9. Means as defined in claim 1, said cloth having a tensile strength of at least 30 pounds per inch.

10. Means as defined in claim 1, said cloth having a tensile strength of at least 5 pounds per inch.

References Cited

UNITED STATES PATENTS

| | | | |
|---|---|---|---|
| 3,007,596 | 11/1961 | Matsch | 220—9 |
| 3,009,600 | 11/1961 | Matsch | 220—9 |
| 3,204,804 | 9/1965 | Hnilicka | 220—9 |
| 3,231,125 | 1/1966 | Sigona | 220—9 |
| 3,274,788 | 9/1966 | Hoffman et al. | 220—9 |

THERON E. CONDON, *Primary Examiner.*

J. R. GARRETT, *Assistant Examiner.*